Figure 1:
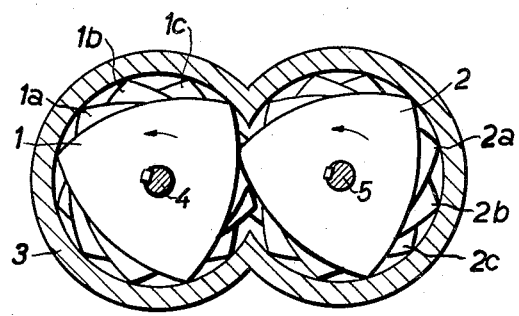

Nov. 26, 1957 — R. ERDMENGER — 2,814,472

MIXING AND KNEADING MACHINE

Filed July 27, 1954

Section a-b

INVENTOR.
RUDOLF ERDMENGER
BY Burgess and Dinklage
ATTORNEYS

United States Patent Office 2,814,472
Patented Nov. 26, 1957

2,814,472
MIXING AND KNEADING MACHINE

Rudolf Erdmenger, Bergisch-Gladbach, Germany, assignor to Farbenfabriken Bayer Aktiengesellschaft, Leverkusen, Germany, a corporation of Germany Application July 27, 1954, Serial No. 446,119

Claims priority, application Germany July 27, 1953

1 Claim. (Cl. 259—104)

The present invention relates to an improved mixing and kneading machine and more particularly concerns improvements of the mixing and kneading machine described in the United States Letters Patent 2,670,188.

In the United States Letters Patent 2,670,188 there is described a mixing and kneading machine comprising a casing, at least two rotatable shafts positioned in said casing for rotation in the same direction, at least two cam disks eccentrically positioned, one on each said shaft for near circumferential contact with each other at any position of rotation of said shaft, said shafts and cam disks being dimensioned and positioned so that the circumferential portion of any cam disk farthest from the center of its shaft will upon rotation of said shafts pass in near surface contact with at least a portion of the immediate adjacent inner surface of said casing, and means for rotating said shafts in the same direction.

During rotation of cam shafts comprising cam disks of the same shape and size, the circumference of said cam disks being composed of arcs of different circles or the cam disks being circular disks, the volume between two cam disks which cooperate with one another is continuously varied so that the material under treatment is thoroughly kneaded. Machines of this type are excellently suitable for mixing and kneading pasty material whereas dry, for instance pulverulent material, inhibits or even prevents the rotation of the machine.

The principal object of the present invention is to provide a mixing and kneading machine which is especially adapted to knead and mix dry and pulverulent material.

This and further objects of the invention are accomplished by means of a mixing and kneading machine of the type described in the United States Letters Patent 2,670,188, having at least two cam shafts, each of said cam shafts being provided with at least two symmetrical cam disks centrically mounted on said cam shaft, said cam disks having the shape or the approximate shape of an equilateral triangle whose sides are equal arcs. The triple-point structure of these cam disks enables the material under treatment to be shovelled or sheared three times upon each rotation of the cam disks within the space formed by the wall of the casing and two disks cooperating with one another. The volume of this space is constantly equal upon the rotation of the cam shafts but the shape of this space changes continuously. This prevents the blocking of the rotation of the cam shafts when dry and pulverized material is under treatment.

In the accompanying diagrammatic drawing the invention is illustrated by way of example, showing the rotation of the shafts in the same direction.

The inventive idea is also applicable for shafts rotating in opposite direction, however, in that case the shape of the arms must be adapted to the rotation of opposite direction.

Figure 2:
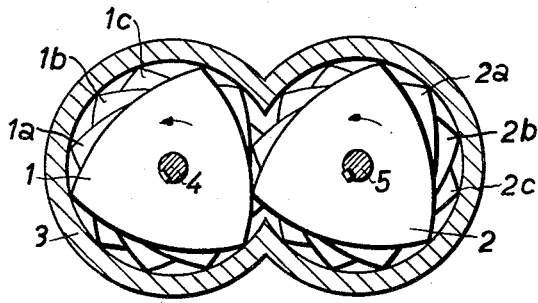
Figure 3:
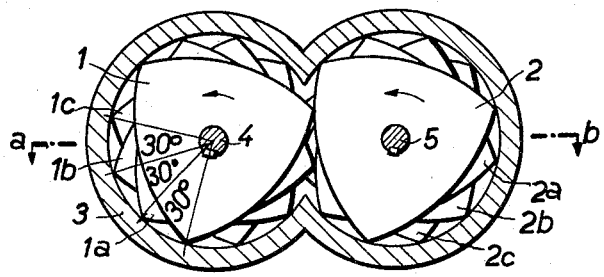

In the accompanying drawing, Figures 1, 2 and 3 are cross-sections of a mixing and kneading machine according to the invention, showing the cam disks of the two cam shafts in three different positions of rotation.

Figure 4:
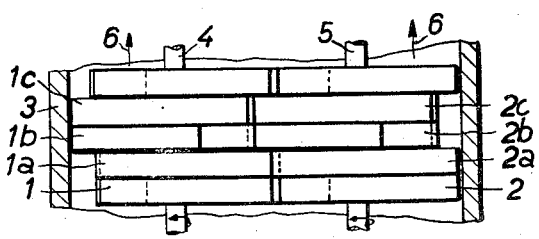

Figure 4 is a longitudinal section along the line a—b of the mixing and kneading machine as shown in Figure 3, through the casing of the machine.

In the drawing, the machine has two cam shafts. The cam shaft on the left-hand side consists of the individual disks 1, 1a, 1b, 1c etc., which are centrically fixed on the common shaft 4 in angular displacement (30°) and staggered relation to each other. The cam shaft on the right-hand side has the disks 2, 2a, 2b, 2c etc., which are centrically fixed on the common shaft 5 in the same manner as set forth with reference to the cam shaft on the left-hand side. The disks of the two cam shafts are equal in shape and size. Both the disks 1, 1a, 1b, 1c etc. and the disks 2, 2a, 2b, 2c etc. form spirals. Both cam shafts are closely surrounded by the common casing 3. They rotate in the same direction and advance the material under treatment in the direction of the arrows 6. Each disk of the cam shafts has the shape of a triangle whose three sides are equal arcs. The vertices of these triangles may be truncated. The middle of the circles of these arcs are the corners of the disks. All the three corners of each disk are positioned at an equal distance from the shaft. The shafts 4 and 5, on which the disks are mounted, run parallel to one another. They are positioned at a distance from one another corresponding to the approximate length of the radius of one arc.

I claim:

A mixing and kneading machine comprising a casing, at least two parallel spaced apart rotatable shafts positioned in said casing for rotation in the same direction, at least four symmetrical cam discs positioned centrally on each shaft with each of said discs on each shaft being staggered at about a 30° angular displacement with respect to the next succeeding disc on its shaft and substantially in contact therewith, each of said cam discs having the shape of an equilateral triangle, the sides of which are equal arcs with the middle of the circles of said arcs being the corners of said discs and the radii of said arcs substantially corresponding to the distance between the said shafts, said cam discs having peripheral surfaces extending in a plane substantially parallel to the axis of rotation of said shafts, with the cam discs on one of said shafts being positioned in substantial near adjacent circumferential contact with opposed cam discs of the other shaft at any position of rotation of said shaft, and means for rotating said shafts in the same direction.

References Cited in the file of this patent

UNITED STATES PATENTS

| 2,670,188 | Erdmenger | Feb. 23, 1954 |
| 2,672,404 | Schultz | Mar. 16, 1954 |

FOREIGN PATENTS

| 137,675 | Sweden | 1925 |
| 967,196 | France | 1950 |